United States Patent
Chen et al.

(10) Patent No.: US 8,063,512 B2
(45) Date of Patent: Nov. 22, 2011

(54) POWER-SAVING POWER SUPPLY APPARATUS WITH BATTERY MODULE

(75) Inventors: Fu-Sung Chen, Taipei Hsien (TW); Yang Wang, Taipei Hsien (TW); Sen-Chi Lin, Taipei Hsien (TW)

(73) Assignee: Chicony Power Technology Co., Ltd., Taipei (TW)

( * ) Notice: Subject to any disclaimer, the term of this patent is extended or adjusted under 35 U.S.C. 154(b) by 195 days.

(21) Appl. No.: 12/503,933

(22) Filed: Jul. 16, 2009

(65) Prior Publication Data

US 2011/0012428 A1   Jan. 20, 2011

(51) Int. Cl.
*H02J 7/00* (2006.01)
(52) U.S. Cl. .......................................... 307/66
(58) Field of Classification Search ............... 307/66
See application file for complete search history.

(56) References Cited

U.S. PATENT DOCUMENTS

| | | | |
|---|---|---|---|
| 6,144,169 A * | 11/2000 | Janczak | 315/224 |
| 6,853,564 B2 * | 2/2005 | Kravitz | 363/44 |
| 2005/0168189 A1 * | 8/2005 | Schweigert | 320/107 |

* cited by examiner

*Primary Examiner* — Robert L. Deberadinis
(74) *Attorney, Agent, or Firm* — Chun-Ming Shih; HDLS IPR Services

(57) ABSTRACT

A power-saving power supply apparatus with battery module converts an inputted AC power into an outputted DC power and includes: a Triac switch electrically connected to the inputted AC power; a Triac driver electrically connected to the Triac switch; a power microprocessor electrically connected to the Triac driver; and a battery module electrically connected to the power microprocessor. When the apparatus is idle or in low workload, the power microprocessor sends a switch signal to the Triac driver to turn off the Triac switch and thus shut off the inputted AC power. Thus, the apparatus is standby with relatively low consumption of electricity. At this time, the battery module provides power to the power microprocessor.

10 Claims, 1 Drawing Sheet

POWER-SAVING POWER SUPPLY APPARATUS WITH BATTERY MODULE

BACKGROUND OF THE INVENTION

1. Field of the Invention

The present invention relates to a power-saving power supply apparatus, and in particular to a power-saving power supply apparatus with battery module.

2. Description of Prior Art

Since the resources in earth are decreasing gradually, nations all over the world attempt to develop alternative energy resources or renewable energy resources to solve the possible problem that the lack of resources may cause economical crisis or affect the industries seriously. In addition to develop new energy sources, saving power is also important to do. Thus, developing new energy sources and saving power can be implemented at the same time without coming into conflict, whereby the power sources in earth can be used for a longer period of time. Thus, many people start to pay attention to the solutions of saving power in various sites. For example, people intend to save water, electricity and gasoline in their daily life, offices or business sites. In order to promote the power-saving effect, the Government has issued some policies to reward the execution of saving power in a house, office or business site. For example, in order to encourage the user to consume power more frugally, the Power Company signs a contract with the user in which a contract capacity is prescribed as the basis of counting the power bill. If the power consumed by the user exceeds the contract capacity, the user has to pay the power bill with different multiples, whereby the unnecessary consumption of electricity can be reduced. Therefore, we have to save power at anytime and anyplace.

It is necessary to use a power supply to maintain the operation of an electric appliance. Thus, a power supply apparatus is used to supply power to the electric appliance. The input end, usually a plug, of the power supply device is connected to a power socket so as to receive 110V-220V AC power. The output end of the power supply apparatus is to output a power suitable for the operation of the electric appliance. When the electric appliance is not used, however, the plug of the power supply apparatus usually remains connected to the power socket. People often forget to remove the plug from the power socket for two reasons. Removing the plug from the power socket repeatedly is inconvenient for the user. On the other hand, the repeated removal and connection of the plug may cause the plug and power socket to suffer damage. However, when the plug of the power supply apparatus is connected to the power socket, a small amount of power is still consumed even the electric appliance is not in operation. Such a small consumption of electricity may result from the elements within the power supply apparatus (such as rectifier, filter, transistors, coils or the like) and will generate heat inevitably. After the accumulation for a long period of time, such a small consumption of electricity may become significant.

According to prior art, the existing solution is to provide a switch element such as a relay in the input end of AC power, thereby rendering a mechanism for shutting off AC power. However, providing an additional switch element in the input end of AC power has drawbacks including the increase in cost, the reduction in conversion efficiency, and the deterioration of heat dissipation.

Therefore, it is an important issue to provide a power supply apparatus, which can detect whether it is idle or under a low workload and, if necessary, automatically shut off the AC power at the input end, thereby reducing the cost without deteriorating the conversion efficiency and the heat-dissipating effect. Even the electric appliance is not in use while the plug of the power supply apparatus remains connected to the power socket, the user needs not to worry about the waste of electricity.

SUMMARY OF THE INVENTION

In order to overcome the drawbacks of prior art, the present invention is to provide a power-saving power supply apparatus with battery module, thereby reducing the cost without deteriorating the conversion efficiency and the heat-dissipating effect.

The power-saving power supply apparatus with battery module according to the present invention converts an inputted AC power into an outputted DC power and includes: a Triac switch electrically connected to the inputted AC power; a Triac driver electrically connected to the Triac switch; a power microprocessor electrically connected to the Triac driver; and a battery module electrically connected to the power microprocessor. The power microprocessor sends a switch signal to the Triac driver to turn off the Triac switch and thus shut off the inputted AC power. At this time, the battery module provides power to the power microprocessor.

DETAILED DESCRIPTION OF THE INVENTION

Figure 1:
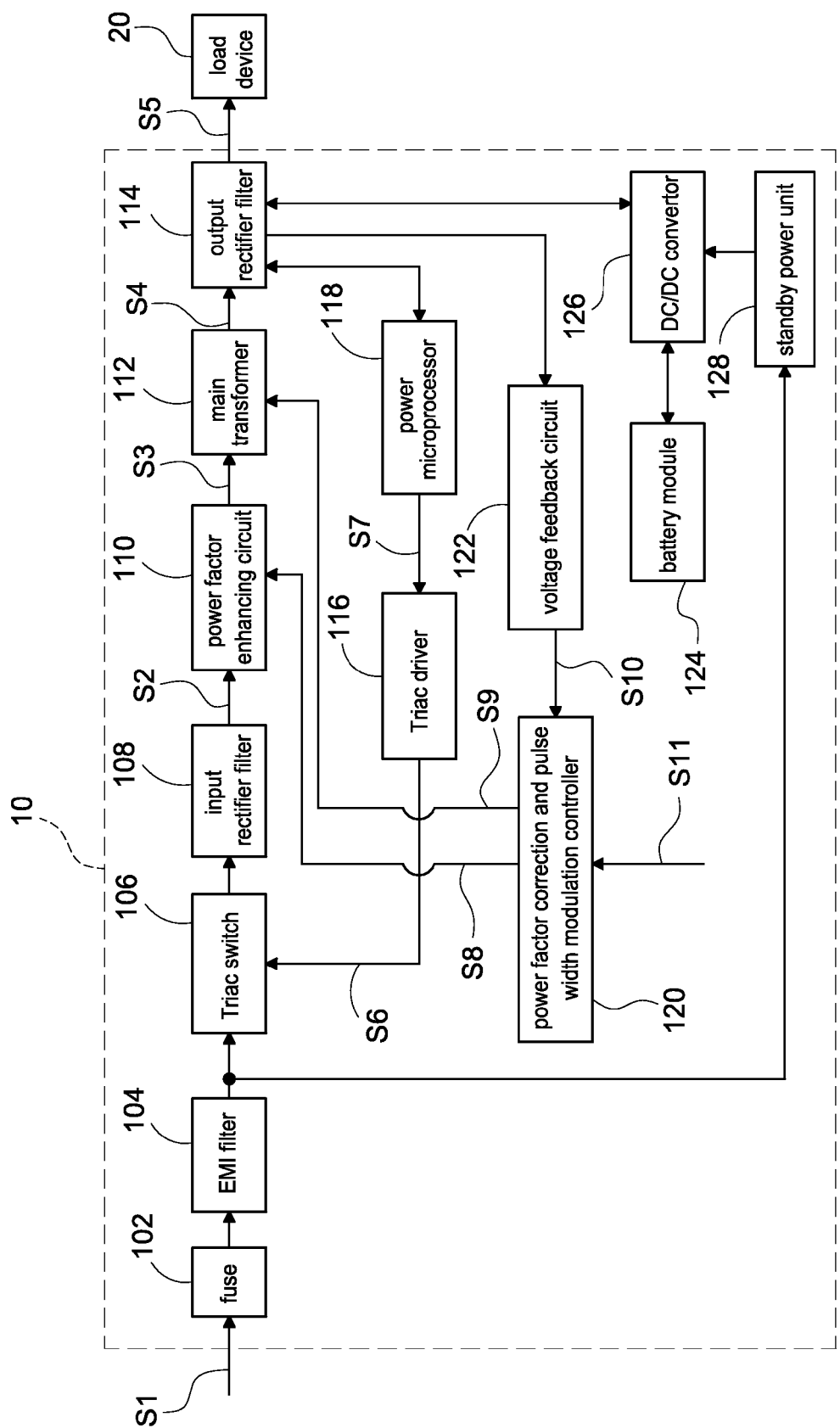
FIG. 1 is a block view showing the power-saving power supply apparatus with battery module according to the present invention.

Please refer to FIG. 1, which is a block view showing the power-saving power supply apparatus with battery module according to the present invention. The power-saving power supply apparatus 10 with battery module according to the present invention can convert an inputted AC power S1 into an outputted DC power S5. The converted DC power can be applied to a load device 20, thereby proving power to the load device 20. The inputted AC power S1 is an AC power of 90-264 volt. The power-saving power supply apparatus 10 with battery module can operate under a normal conversion mode or an AC power shut-off mode. In the normal conversion mode, the power-saving power supply apparatus 10 with battery module is in normal operation to convert the inputted AC power S1 into the outputted DC power S5, thereby providing power to the load device 20. In the AC power shut-off mode, the power-saving power supply apparatus 10 with battery module is idle or in a low workload, so that the inputted AC power S1 is shut off and thus the outputted DC power S5 cannot be generated. Therefore, when the power-saving power supply apparatus 10 with battery module is in the AC power shut-off mode, it is on standby with relatively low consumption of electricity.

The power-saving power supply apparatus 10 with battery module comprises a fuse 102, an EMI filter 104, a Triac switch 106, an input rectifier filter 108, a power factor enhancing circuit 110, a main transformer 112, an output rectifier filter 114, a Triac driver 116, a power microprocessor 118, a power factor correction and pulse width modulation controller 120, a voltage feedback circuit 112, a battery module 124 and a DC/DC converter 126.

The fuse 102 is electrically connected to the EMI filter 104. The Triac switch 106 is electrically connected to the EMI filter 104, the input rectifier filter 108 and the Triac driver 116. The power factor enhancing circuit 110 is electrically connected to the input rectifier filter 108, the main transformer 112 and the power factor correction and pulse width modulation controller 120. The output rectifier filter 114 is electrically connected to the main transformer 112, the power microprocessor 118, the voltage feedback circuit 122, the DC/DC converter 126 and the load device 20. The power factor correction and pulse width modulation controller 120 is electrically connected to the power factor enhancing circuit 110, the main transformer 112 and the voltage feedback circuit 122. The Triac driver 116 is electrically connected to the Triac switch 106 and the power switch microprocessor 118. The battery module 124 is electrically connected to the DC/DC converter 126.

The fuse 102 serves as an overload protection for the downstream circuit The EMI filter 104 is used to filter out any possible electromagnetic interference.

The Triac switch 106 further comprises a gate (not shown), a first channel end (not shown), and a second channel end (not shown). The first channel end of the Triac switch 106 is electrically connected to the EMI filter 104. The second channel end of the Triac switch 106 is electrically connected to the input rectifier filter 108. The gate of the Triac switch 106 is electrically connected to the Triac driver 116. The first channel end of the Triac switch 106 and the second channel end of the Triac switch 106 can be electrically connected to each other or insulated from each other based on the control of the Triac driver 116. When the first channel end of the Triac switch 106 is electrically connected to the second channel end of the Triac switch 106, the power-saving power supply apparatus 10 with battery module is operated in the normal conversion mode. When the first channel end of the Triac switch 106 is electrically insulated from the second channel end of the Triac switch 106, the power-saving power supply apparatus 10 with battery module is operated in the AC power shut-off mode.

The input rectifier filter 108 is used to rectify and filter the inputted AC power S1 so as to provide a ripple voltage S2 to the power factor enhancing circuit 110. After the power factor enhancing circuit 110 receives the ripple voltage S2, under the control of the power factor correction and pulse width modulation controller 120, the ripple voltage S2 is converted into a first voltage S3 to enhance the power factor. The first voltage S3 is transmitted to the main transformer 112. After the main transformer 112 receives the first voltage S3, it converts the first voltage S3 into a second voltage S4. The second voltage S4 is transmitted to the output rectifier filter 114. After the output rectifier filter 114 receives the second voltage S4, it rectifies and filters the second voltage S4 to generate the output DC power S5. The output rectifier filter 114 transmits the output DC power S5 to the load device 20, thereby providing power to the load device 20.

The voltage feedback circuit 122 provides a feedback voltage S10 to the power factor correction and pulse width modulation controller 120. The power factor correction and pulse width modulation controller 120 generates a power factor correction driving signal S8 based on a power factor correction sensing signal S11, and transmits the driving signal S8 to the power factor enhancing circuit 110 to drive the power factor enhancing circuit 110. After the power factor correction and pulse width modulation controller 120 receives the feedback voltage S10, it generates a corresponding pulse width modulation signal S9 based on the feedback voltage S10 and used to control the energy conversion of the main transformer 112. In this way, the output rectifier filter 114 can generate the output DC power S5.

The Triac driver 116 comprises a control side (not shown) and a channel side (not shown). The control side of the Triac driver 116 is electrically connected to the power microprocessor 118 and receives a switch signal S7 transmitted by the power microprocessor 118. The channel side of the Triac driver 116 is electrically connected to the gate of the Triac switch 106.

When the power-saving power supply apparatus 10 with battery module is under a normal workload, the power microprocessor 118 generates a high-potential switch signal S7. The power microprocessor 118 transmits this high-potential switch signal S7 to the Triac driver 116. When the switch signal S7 is of a high potential, the channel side of the Triac driver 116 generates a Triac driving current S6. As a result, the first channel end of the Triac switch 106 is electrically connected with the second channel end of the Triac switch 106. At this time, the power-saving power supply apparatus 10 with battery module is in the normal conversion mode.

When the power-saving power supply apparatus 10 with battery module is idle or under a low workload, the power microprocessor 118 detects this condition and generates a low-potential switch signal S7. The power microprocessor 118 transmits this low-potential switch signal S7 to the Triac driver 116. When the switch signal S7 is of a low potential, the channel side of the Triac driver 116 is turned off. As a result, the first channel end of the Triac switch 106 is electrically insulated from the second channel end of the Triac switch 106, which makes the Triac switch 106 to shut off the input AC power S1. At this time, the power-saving power supply apparatus 10 with battery module is in the AC power shut-off mode. When the power-saving power supply apparatus 10 with battery module is in the AC power shut-off mode, it is on standby with relatively low consumption of electricity.

The power microprocessor 118 detects the working state of the power-saving power supply apparatus 10 with battery module. When the power-saving power supply apparatus 10 with battery module is in the normal conversion mode, the output rectifier filter 114 provides power to the power microprocessor 118. When the power-saving power supply apparatus 10 with battery module is in the AC power shut-off mode, the output rectifier filter 114 cannot provide power to the power microprocessor 118 directly. At this time, via the DC/DC converter 126 and the output rectifier filter 114, the battery module 124 can provide power to the power microprocessor 118.

When the power-saving power supply apparatus 10 with battery module is in the normal conversion mode, the output rectifier filter 114 performs a charging process to the battery module 124. Alternatively, if the battery module is a solar power battery module, the battery module 124 can absorb the solar power and convert it into electric power. The converted electric power can be stored in the battery module 124 for subsequent use. When the power-saving power supply apparatus 10 with battery module is in the AC power shut-off mode, if the battery module is a solar power battery module, the battery module 124 can absorb the solar power and convert it into electric power. Since the solar power battery module can convert the solar power into electric power, the use of the solar power battery module makes the present invention more conform to the requirements for environmental protection.

The power-saving power supply apparatus 10 with battery module further comprises a standby power unit 128 that is electrically connected to the DC/DC convert 126. The standby power unit 128 consumes relatively small amount of electricity, and it can convert the input AC power S1 into a DC power. When the power-saving power supply apparatus 10 with battery module is in the AC power shut-off mode, the output rectifier filter 114 cannot provide power to the power microprocessor 118 directly. As mentioned in the above, at this time, via the DC/DC converter 126 and the output rectifier filter 114, the battery module 124 can provide power to the power microprocessor 118. In addition, the standby power unit 128 may have a voltage-converting function, and it can be electrically connected to the output rectifier filter 114. Thus, the output rectifier filter 114 can provide power to the power microprocessor 118.

The DC/DC converter 126 converts the voltage transmitted by the battery module 124 or the standby power unit 128 into a working voltage suitable for the power microprocessor 118. When the power-saving power supply apparatus 10 with battery module is in the normal conversion mode, the output rectifier filter 114 utilizes the DC/DC converter 126 to convert the voltage into a suitable voltage for charging the battery module 124. The load device 20 may be a portable electronic device such as a notebook computer or electronic book. The Triac driver 116 may be a phototriac.

According to the present invention, the power-saving power supply apparatus 10 with battery module utilizes the power microprocessor 118 to detect whether the power-saving power supply apparatus 10 with battery module is idle or under a low workload and, if necessary, transmits a low-potential switch signal S7 to the Triac driver 116 to turn off the Triac switch 106 and shut off the input AC power S1. Therefore, the power-saving power supply apparatus 10 with battery module can be maintained on standby with relatively low consumption of electricity. At this time, the battery mode 124 or the standby power unit 128 provides power to the power microprocessor 118. The Triac driver 116 used in the present invention is so cheap and only consumes relatively small amount of electricity. Thus, the present invention will not increase cost or deteriorate the conversion efficiency, so that it can overcome the drawbacks of prior art.

According to the above, the present invention really demonstrates industrial applicability, novelty and inventive steps. Further, the structure of the present invention has not been seen in products of the same kind or let in public use, which conforms to the requirements for a utility model patent.

What is claimed is:

1. A power-saving power supply apparatus with battery module applied to a load device, the power-saving power supply apparatus with battery module capable of converting an inputted AC power into an outputted power and comprising:
    a Triac switch electrically connected to the inputted AC power;
    a Triac driver electrically connected to the Triac switch;
    a power microprocessor connected to the Triac driver; and
    a battery module electrically connected to the power microprocessor,
    wherein when the power-saving power supply apparatus with battery module is idle or in low workload, the power microprocessor sends a low-potential switch signal to the Triac driver to turn off the Triac switch and thus shut off the inputted AC power, so that the battery module provides power to the power microprocessor to detect whether the power-saving power supply apparatus with battery module is not idle or in low workload; when the power-saving power supply apparatus with battery module is not idle or not in low workload detected by the power microprocessor, the power microprocessor sends a high-potential switch signal to the Triac driver to turn on the Triac switch and thus the inputted AC power is converted into the outputted power, so that the battery module does not provide power to the power microprocessor.

2. The power-saving power supply apparatus with battery module according to claim 1, wherein the Triac driver is a phototriac.

3. The power-saving power supply apparatus with battery module according to claim 2, further comprising an EMI filter electrically connected to the Triac switch for filtering out electromagnetic interference.

4. The power-saving power supply apparatus with battery module according to claim 3, further comprising;
    an input rectifier filter electrically connected to the Triac switch for rectifying and filtering the input AC power to provide a ripple voltage;
    a power factor enhancing circuit electrically connected to the input rectifier filter for converting the ripple voltage into a first voltage; and
    a main transformer electrically connected to the power factor enhancing circuit for converting the first voltage into a second voltage.

5. The power-saving power supply apparatus with battery module according to claim 4, further comprising an output rectifier filter electrically connected to the main transformer for rectifying and filtering the second voltage to generate the outputted DC power.

6. The power-saving power supply apparatus with battery module according to claim 5, further comprising a voltage feedback circuit electrically connected to the output rectifier filter for providing a feedback voltage.

7. The power-saving power supply apparatus with battery module according to claim 6, further comprising a power factor correction and pulse width modulation controller electrically connected to the voltage feedback circuit for generating a power factor correction driving signal based on a power factor correction sensing signal and used to drive the power factor enhancing circuit, and for generating a corresponding pulse width modulation signal based on the feedback voltage and used to control the power conversion of the main transformer, whereby the output rectifier filter generates the output DC power.

8. The power-saving power supply apparatus with battery module according to claim 7, wherein the battery module is a solar power battery module for absorbing solar power and converting it into electric power.

9. The power-saving power supply apparatus with battery module according to claim 8, further comprising a DC/DC converter electrically connected to the battery module for converting the voltage transmitted by the battery module into a working voltage suitable for the power microprocessor.

10. The power-saving power supply apparatus with battery module according to claim 8, further comprising a standby power unit electrically connected to the power microprocessor for providing power to the power microprocessor.

* * * * *